United States Patent Office 2,724,688
Patented Nov. 22, 1955

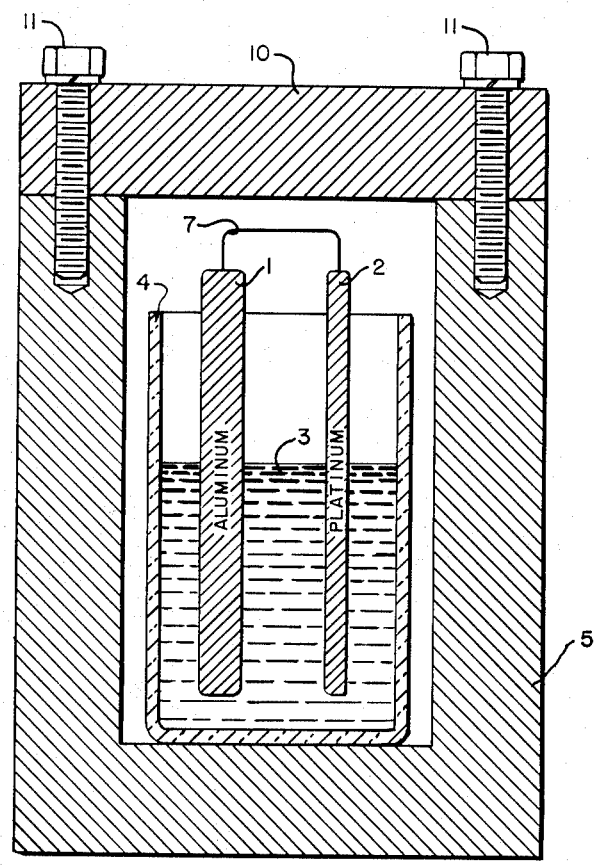

2,724,688
PROCESS OF GROWING CRYSTALS OF ALUMINUM PHOSPHATE

John W. Gruner, Minneapolis, Minn., assignor to the United States of America as represented by the Secretary of the Army Application April 29, 1952, Serial No. 284,973

1 Claim. (Cl. 204—90)

This invention relates to a process of growing crystals of aluminum phosphate ($AlPO_4$, Berlinite) suitable for piezo electric applications.

To grow aluminum phosphate crystals suitable for piezo electric applications it is necessary to prepare highly concentrated solutions of aluminum phosphate which solutions must be as pure as possible. The known methods of preparing such solutions are either very time consuming or tend to form hydrated crystals of aluminum phosphate which hydrated crystals are practically impossible to redissolve. Another difficulty is the great viscosity of highly concentrated aluminum phosphate solutions which are almost as thick as a heavy syrup and therefore very hard to handle.

The general object of this invention is to overcome these difficulties by a process which provides aluminum ions in a phosphoric acid solution during the formation of the aluminum phosphate crystals.

Briefly stated, the new process consists in heating in an autoclave an electrolytic cell comprising a platinum electrode, an aluminum electrode, and an electrolyte containing phosphoric acid.

The invention and its objects will become more apparent from the following description and accompanying illustration of a specific embodiment of the inventive idea.

The drawing shows a sectional view thru an autoclave inclosing an electrolytic cell according to the invention.

This electrolytic cell consists of an aluminum electrode 1, a platinum electrode 2 and an electrolyte 3 containing phosphoric acid. The electrolyte may, e. g., consist of an aqueous solution of $H_3PO_4$, having a concentration of 4 N or higher. These elements are placed in a Pyrex glass container 4 which in turn is put into a steel bomb or autoclave 5 capable of withstanding pressures developed during the operation. The platinum electrode 2 and the aluminum electrode 1 are short circuited by a platinum wire 7 which directly connects the electrodes above the level of the electrolyte. The steel bomb 5 is closed by a cover 10 which is secured to the bomb by bolts 11.

The closed autoclave 5 containing the cell is heated until the formation of aluminum crystals occurs. Preferably the temperature is held in the range of 200 to 300° C. and heating is continued for a period of at least 40 to 70 hours.

The above described electrolytic cell functions in such a manner that aluminum ions go into solution at the aluminum electrode 1 while hydrogen is liberated at the platinum electrode 2 so as to provide a solution of aluminum phosphate in phosphoric acid.

It will be obvious to those skilled in the art that various changes may be made with regard to the specified conditions without departing from the spirit of the invention.

What is claimed is:

Method of growing aluminum phosphate crystals suitable for piezo-electric application comprising heating in an autoclave at temperatures ranging from 200 to 300° C. for at least 40 hours, an electrolytic cell, said cell containing an aluminum electrode, a platinum electrode and an electrolyte consisting of a concentrated aqueous solution of phosphoric acid, said electrodes being short-circuited.

References Cited in the file of this patent

UNITED STATES PATENTS

| | | |
|---|---|---|
| 627,267 | Luckow | June 20, 1899 |
| 2,169,576 | Booth et al. | Aug. 15, 1939 |